United States Patent Office 3,096,330
Patented July 2, 1963

3,096,330
PRODUCTION OF PYRAZINOIC ACID
Harold Gainer, Southgate, and Moses Cenker, Trenton, Mich., assignors to Wyandotte Chemicals Corporation, Wyandotte, Mich., a corporation of Michigan
No Drawing. Filed Feb. 3, 1960, Ser. No. 6,352
7 Claims. (Cl. 260—250)

This invention relates to a new and unusually reactive alkyl-substituted pyrazine. In one specific aspect, this invention relates to ethylpyrazine as a new composition of matter and in another specific aspect this invention relates to an improved method for preparing pyrazinoic acid from ethylpyrazine.

Pyrazine and certain alkyl-substituted pyrazines are known chemical compounds having significance in the chemical industry. Pyrazine, itself, is employed as a raw material for the manufacture of aminopyrazines and ultimately sulfanilamido pyrazines which have importance in the field of chemotherapy. Methylpyrazine also is an important industrial chemical and is employed for the production of pyrazinoic acid by reaction with permanganate. The oxidation of methylpyrazine with permanganate provides only very low conversions of methylpyrazine to the desired pyrazinoic acid. The reaction is reported by Stoehr, 51, J. Prakt. Chem. (2), 468 (1895) wherein a conversion of about 5% to pyrazinoic acid was obtained. It thus appears that methylpyrazine is a relatively unreactive chemical compound.

It is believed that current commercial operations based on the method of producing pyrazinoic acid using methylpyrazine as a reactant do not provide conversions of greater than about 10% to pyrazinoic acid. The preparation of pyrazinoic acid from 2,3-pyrazinedicarboxylic acid is also known, but this method suffers from the disadvantage of requiring 2,3-pyrazinedicarboxylic acid as a starting material which is difficult to obtain and which is only converted to pyrazinoic acid by a process requiring a number of steps.

An object of this invention, therefore, is to provide a new alkyl-substituted pyrazine compound.

A further object of this invention is to provide a new alkyl-substituted pyrazine which is more reactive than the known alkyl-substituted pyrazine compound, methylpyrazine.

A still further object is to provide an improved method for producing pyrazinoic acid.

We have discovered the new chemical compound, ethylpyrazine, and we have found that an outstandingly high yield of pyrazinoic acid is obtained when ethylpyrazine is oxidized with permanganate. Ethylpyrazine is a monoalkyl carbon-substituted pyrazine which distills at 152–153° C. and yields a picrate salt which melts at 151–152° C. Thus, while methylpyrazine can be oxidized by permanganate to pyrazinoic acid with yields in the range of 5–10%, ethylpyrazine has been oxidized under comparable conditions to pyrazinoic acid with a yield of 48% and with 99.8% purity. This is believed to be a yield which is about five times as high as that which is normally obtained when pyrazinoic acid is prepared by oxidizing methylpyrazine with permanganate. Since pyrazinoic acid is an important chemical compound which is used for the preparation of pyrazineamide, a known tuberculostat, the surprisingly high yield of pyrazinoic acid that can be obtained from ethylpyrazine makes ethylpyrazine an unusually desirable new chemical compound.

Ethylpyrazine can be prepared by a number of methods such as the cyclodehydration-dehydrogenation of N-(2-hydroxy-butyl)-ethylenediamine, dehydrogenation of 2-ethylpiperazine or the reaction of a methyl halide with sodio-2-methylpyrazine in liquid ammonia. The ethylpyrazine which we made and used was prepared by the dehydrogenation of 2-ethylpiperazine in high yields employing an aqueous solution of 2-ethylpiperazine and a prereduced copper chromite catalyst at 300–350° C.

The new method for the production of pyrazinoic acid comprises mixing an aqueous solution of ethylpyrazine with a permanganate. The method is carried out by adding the solid permanganate, usually an alkali metal permanganate, to an aqueous solution of ethylpyrazine while continuously stirring the reactants. The permanganate is added portionwise over a period of time and at such a rate that the permanganate color is continuously removed from the reaction mixture. Control of the reaction is obtained by the rate at which permanganate is added and the temperature of the reaction. Desirably, the portionwise addition of permanganate and the reaction temperature are controlled together so that the permanganate color is continuously removed from the reaction mixture. After permanganate addition is complete, the process is completed by stirring the reaction mixture until the permanganate color has substantially disappeared, separating and removing precipitated manganese dioxide from the reaction mixture and adding an acid to the reaction mixture which is stronger than pyrazinoic acid in order to precipitate pyrazinoic acid. The pyrazinoic acid product obtained by this method is a white solid which usually has a purity of over 99%.

Any permanganate can be used in the reaction with ethylpyrazine. Usually an alkali metal permanganate, such as sodium, potassium or lithium permanganate is used, but calcium permanganate can also be used. The amount of permanganate used is about the theoretical amount which is 4 mols of permanganate per mol of ethylpyrazine. A slight excess of permanganate is desirable in order to get the highest yields of pyrazinoic acid.

The temperature at which the reaction is carried out can be varied over a wide range but it is desirable to carry out the reaction at the lowest temperature at which a satisfactory reaction rate is obtained since higher temperatures tend to promote side reactions which tend to destroy the pyrazinoic acid product. Broadly, the temperature can be from 10 to about 70° C. although higher and lower temperatures can be employed. The 48% yield of pyrazinoic acid having a purity of 99.8% referred to hereinabove was obtained when the temperature was maintained at about 20–25° C. After initially slightly warming the aqueous solution of ethylpyrazine and the first portion of permanganate added thereto, the reaction mixture is cooled so as to maintain the temperature desirably at about room temperature.

As has been noted above, the permanganate is added portionwise to the aqueous solution of ethylpyrazine while stirring the reactants. The rate of addition of permanganate is selected and controlled in conjunction with the temperature of the process so as to insure that the color of permanganate is continuously removed, which indicates that the reaction is proceeding, while at the same time maintaining the rate of addition high enough to insure the continuity of the reaction. Usually, permanganate color remains in the reaction mixture after the theoretical amount of permanganate has been added. It is desirable that the reaction mixture be stirred at the reaction temperature following the completion of the addition of permanganate until the permanganate color is completely removed indicating the completion of the reaction.

A feature of the process of this invention is the use of a solid permanganate to form a high concentration of same in the reaction mixture rather than dilute solutions of permanganate. Thus the process is carried out by adding solid permanganate to the liquid dispersion or solution of ethylpyrazine and the amount of permanganate used can correspond to about a 30% solution thereof. This is in contrast to the method of oxidizing methylpyrazine disclosed by Stoehr, cited above, wherein about a 1% solution of permanganate was employed. An advantage in the present process, then, lies in the large amount of product that can be obtained per unit of volume of the reactants used.

After the reaction is completed by the addition of permanganate and continued stirring until substantially all of the permanganate color has been removed, manganese dioxide, which is precipitated during the reaction, is removed by filtration or any other separation method. The filtrate is acidified with an acid which is stronger than pyrazinoic acid in order to precipitate the pyrazinoic acid product. Mineral acids, such as hydrochloric acid, nitric acid, sulfuric acid, phosphoric acid and organic acids which are stronger than pyrazinoic acid, can be used to precipitate the pyrazinoic acid product. The precipitated product is cooled, filtered, washed with water and dried.

*Example 1*

Ethylpyrazine was prepared by dehydrogenating 2-ethylpiperazine. The 2-ethylpiperazine was dehydrogenated by passing a 76% aqueous solution (2:1 mol ratio of water to 2-ethylpiperazine) over a prereduced copper chromite catalyst.

The copper chromite catalyst (Cu 0203T ⅛, Harshaw Chemical Company) was contained in a 4 ft. x 1 in. glass tube having an internal thermometer well extending the length of the tube. The catalyst tube contained glass beads which filled 3¼ inches of the tube at the bottom, contained 300.0 grams of the copper chromite catalyst and the remainder of the tube was filled with glass beads. The copper chromite catalyst was prereduced by heating the catalyst tube in an electrically heated core furnace and then passing a hydrogen-containing gas stream over the catalyst bed while maintaining the catalyst temperature at about 300° C.

After prereducing the catalyst bed, the aqueous solution of 2-ethylpiperazine was fed to the catalyst tube at about 100 milliliters per hour while the temperature of the catalyst bed was maintained at approximately 350° C. There was obtained 277 grams of condensed effluent from a total of 308 grams of 2-ethylpiperazine feed. The condensed effluent was diluted with an equal weight of water and the ethylpyrazine product distilled as a water azeotrope at 96–97° C. The azeotrope was treated with sodium hydroxide to salt out crude ethylpyrazine (201 grams) which was redistilled. There was obtained 186 grams of ethylpyrazine distilling at 152–153° C. which was 84% of the theoretical yield.

*Example 2*

Twenty-five grams of 2-ethylpyrazine (0.25 mol) and 350 milliliters of water were charged to a one liter, three-necked flask having a stirrer. To the stirred aqueous solution of ethylpyrazine there was added 117 grams (0.74 mol) of potassium permanganate over a period of about three hours. The permanganate color was decolorized initially when the temperature of the ethylpyrazine-water mixture was 52° C. and thereafter the exothermic reaction was cooled so as to maintain the reaction at about 70° C. The maximum temperature observed during the reaction was 80° C.

After the addition of permanganate was completed, the reaction mixture was stirred at about room temperature for about eight hours and then the precipitated manganese dioxide in the reaction mixture was removed by filtration. The filtrate was acidified with concentrated hydrochloric acid which precipitated pyrazinoic acid as white crystals. The crude pyrazinoic acid product was separated by filtration and dried in an oven. There was obtained 10 grams of pyrazinoic acid which had a melting point of 220° C. The 10 grams of product corresponded to a yield of 32%. Titration of a 1.657 gram sample of the product required 25.9 milliliters of 0.513 normal base and, thus, the product had a purity of 99.6%.

It is to be noted that no attempt was made to recover unreacted ethylpyrazine which would increase the percent yield of product still further. The product was a white solid having an excellent appearance.

*Example 3*

A run was made in which 54 grams of ethylpyrazine (0.5 mol) was added to 750 milliliters of water and stirred. To the stirred aqueous solution of ethylpyrazine there was added 315 grams (2.0 mols) of potassium permanganate.

The permanganate was added to the aqueous solution of ethylpyrazine in small portions over a twelve-hour period. The reaction mixture was initially warmed to about 37° C. and thereafter the mixture was cooled so that the temperature was in the range of about 20–25° C. during the addition of permanganate.

Following the completion of the addition of permanganate, the reaction mixture was stirred for about ten hours. The precipitated manganese dioxide was then removed by filtration and 60 milliliters of concentrated hydrochloric acid was added to the filtrate. Pyrazinoic acid was thereby precipitated and the product was cooled, filtered, washed with water and ether and dried. 29.7 grams of pyrazinoic acid was obtained which corresponded to a 48% yield of product.

The pyrazinoic acid product was titrated with 0.5 normal sodium hydroxide and it was found that the product had a purity of 99.8% and a melting point of 218.5 to 219° C.

Thus, ethylpyrazine is a new and an unusually valuable monoalkyl carbon-substituted pyrazine since it can be oxidized to pyrazinoic acid with yields of about five times the yields that can be obtained with the known monoalkyl carbon-substituted pyrazine, methylpyrazine. The invention disclosed herein can also be expressed as the process for producing pyrazinoic acid with remarkably high yield and high purity.

This application is a continuation-in-part of application Serial No. 746,588, filed July 7, 1958, now abandoned, and application-in-part Serial No. 757,140, filed August 25, 1958, now abandoned.

We claim:

1. A process for the production of pyrazinoic acid, which comprises, mixing an aqueous solution of ethylpyrazine with a permanganate, selected from the group consisting of sodium, potassium, lithium and calcium permanganates.

2. A process for the production of pyrazinoic acid, which comprises, adding a permanganate selected from the group consisting of sodium, potassium, lithium and calcium permanganates to an aqueous solution of ethylpyrazine while continuously stirring the resulting reaction mixture, the permanganate being added portionwise at such a rate and the temperature of the reaction mixture being so controlled that the permanganate color is continuously removed.

3. A process for the production of pyrazinoic acid, which comprises, adding a permanganate selected from the group consisting of sodium, potassium, lithium and calcium permanganates to an aqueous solution of ethylpyrazine while continuously stirring the resulting reaction mixture, the permanganate being added portionwise at such a rate and the temperature of the reaction mixture being so controlled that the color of the permanganate is removed, separating and removing precipitated manganese dioxide from the reaction mixture and adding an acid to the reaction mixture which is stronger than pyrazinoic acid to precipitate pyrazinoic acid.

4. A process for the production of pyrazinoic acid, which comprises, adding portionwise a solid permanganate selected from the group consisting of sodium, potassium, lithium and calcium permanganates to an aqueous solution of ethylpyrazine while continuously stirring the resulting reaction mixture, the rate of addition of the permanganate and the temperature of the reaction mixture being so controlled that the permanganate color is continuously removed, the total amount of said permanganate added being about 4 mols of permanganate per mol of ethylpyrazine.

5. A process for the production of pyrazinoic acid, which comprises, adding portionwise a solid permanganate selected from the group consisting of sodium, potassium, lithium and calcium permanganates to an aqueous solution of ethylpyrazine while continuously stirring the resulting reaction mixture, cooling the reaction mixture to the lowest temperature at which the color of the permanganate is removed while simultaneously controlling the rate of addition of the permanganate so that the permanganate color is continuously removed, the total amount of permanganate added being about 4 mols per mol of ethylpyrazine, continuing the stirring of the reaction mixture after permanganate addition is complete until the reaction mixture is decolorized, separating and removing precipitated manganese dioxide from the reaction mixture, adding a mineral acid to the reaction mixture and separating and recovering the resulting precipitated pyrazinoic acid.

6. A method according to claim 5 wherein the temperature of the reaction mixture is maintained during the addition of permanganate at about 10–70° C.

7. A method according to claim 5 wherein the mineral acid used to precipitate the pyrazinoic acid product is hydrochloric acid.

References Cited in the file of this patent

Stoehr, J. Prakt. Chem., volume 51 (1895), page 468.
Wertheim, Textbook of Organic Chemistry (second edition), page 37 (1945).
Jones et al., J. Amer. Chem. Soc., volume 72 (1950), page 3541.
Klein et al., J. Amer. Chem. Soc., volume 73 (1951), page 2950.
Lucas, Organic Chemistry (second edition), page 51 (1953).